United States Patent
Watanabe

(10) Patent No.: US 11,261,325 B2
(45) Date of Patent: Mar. 1, 2022

(54) THERMOPLASTIC URETHANE RESIN MOLDED PRODUCT

(71) Applicant: Nissin Chemical Industry Co., Ltd., Echizen (JP)

(72) Inventor: Kentaro Watanabe, Echizen (JP)

(73) Assignee: NISSIN CHEMICAL INDUSTRY CO., LTD., Echizen (JP)

(*) Notice: Subject to any disclaimer, the term of this patent is extended or adjusted under 35 U.S.C. 154(b) by 13 days.

(21) Appl. No.: 16/791,353

(22) Filed: Feb. 14, 2020

(65) Prior Publication Data

US 2020/0263032 A1  Aug. 20, 2020

(30) Foreign Application Priority Data

Feb. 15, 2019 (JP) .............................. JP2019-025022

(51) Int. Cl.
| | |
|---|---|
| *C08L 75/04* | (2006.01) |
| *C08L 51/08* | (2006.01) |
| *C08L 75/06* | (2006.01) |
| *C08F 283/12* | (2006.01) |
| *C08F 290/14* | (2006.01) |

(52) U.S. Cl.
CPC .......... *C08L 75/06* (2013.01); *C08F 283/124* (2013.01); *C08F 290/148* (2013.01); *C08L 75/04* (2013.01)

(58) Field of Classification Search
None
See application file for complete search history.

(56) References Cited

U.S. PATENT DOCUMENTS

| | | | |
|---|---|---|---|
| 9,863,012 B2 | 1/2018 | Watanabe | |
| 2003/0059695 A1* | 3/2003 | Li | G03G 5/0546 430/66 |
| 2009/0005506 A1* | 1/2009 | Shibata | C08L 51/085 525/63 |

FOREIGN PATENT DOCUMENTS

| | | | |
|---|---|---|---|
| EP | 1174466 | * | 1/2002 |
| JP | 2001-261919 A | | 9/2001 |
| JP | 2002-363403 A | | 12/2002 |
| JP | 2003-82227 A | | 3/2003 |
| JP | 2004-107526 A | | 4/2004 |
| JP | 2007-138326 A | | 6/2007 |
| JP | 2007138326 | * | 6/2007 |
| JP | 2007-314919 A | | 12/2007 |
| JP | 2008-308785 A | | 12/2008 |
| JP | 2010-241963 A | | 10/2010 |
| JP | 2015-224252 A | | 12/2015 |
| JP | 2016-138242 A | | 8/2016 |

* cited by examiner

*Primary Examiner* — David J Buttner
(74) *Attorney, Agent, or Firm* — Westerman, Hattori, Daniels and Adrian, LLP

(57) ABSTRACT

A resin molded product includes: (I) a thermoplastic urethane resin: 80 to 99.9% by weight; and (II) a silicone acrylic graft copolymer resin: 0.1 to 20% by weight, the silicone acrylic graft copolymer resin comprising: (A) an organopolysiloxane represented by the specific formula; and (B) an acrylic ester unit or a methacrylic ester unit, wherein a weight ratio of these components is (A):(B)=50:50 to 90:10.

6 Claims, No Drawings

THERMOPLASTIC URETHANE RESIN MOLDED PRODUCT

CROSS-REFERENCE TO RELATED APPLICATION

This non-provisional application claims priority under 35 U.S.C. § 119(a) on Patent Application No. 2019-025022 filed in Japan on Feb. 15, 2019, the entire contents of which are hereby incorporated by reference.

TECHNICAL FIELD

The present invention relates to a thermoplastic urethane resin molded product made of a thermoplastic urethane resin composition containing a silicone acrylic graft copolymer resin.

BACKGROUND ART

Conventionally, methane resin molded products have been widely used for stationery, toys, home appliances, car seats, furniture, clothing, shoes, bags, sanitary goods, outdoor tents and the like. When used in these applications, the urethane resin molded product needs to have excellent tactile sensation and lubricity, and in view of productivity, it needs mold releasability when molded.

However, when the urethane resin is used alone, the slidability and the like are insufficient, and it is often impossible to sufficiently cope with a field requiring abrasion resistance, and further performance improvement has been demanded.

Furthermore, as a method for improving the abrasion resistance and lubricity of a urethane resin molded product, it is known that a silicone component such as silicone oil or silicone powder is kneaded into the urethane resin when the resin molded product is produced. For example, in JP-A 2007-138326 (Patent Document 1), acrylic-silicone copolymer particles are kneaded with urethane elastomer to successfully improve the abrasion resistance of synthetic leather. However, in this case, since the silicone powder is kneaded into the urethane resin, the manufacturing process becomes complicated. In addition, in order to obtain abrasion resistance performance, it is necessary to increase the amount of acrylic-silicone copolymer particles added, and if this amount is large, the transparency of the methane resin molded product cannot be maintained.

In order to solve this problem, there is a method of coating a resin or the like on a leather surface such as natural leather or synthetic leather. JP-A 2007-314919 (Patent Document 2) discloses that abrasion resistance is improved by applying a surface finishing agent obtained by adding a crosslinking agent and a polyether-modified silicone to an aqueous polyurethane resin to artificial leather. However, in this case, since the hydrophilicity of the surface finishing agent becomes strong, it is concerned that when a dark-colored beverage such as coffee and the like or a liquid adheres, the liquid color moves to the leather, or when the clothes are rubbed, the antifouling property of the leather surface may be lost, such as the color of the fiber moving to the leather.

In order to solve the above problem, for example, in JP-A 2002-363403 (Patent Document 3), there is a proposal to try to improve slidability by using a specific polyolefin resin in combination with a fluorine-based or silicone-based lubricant. However, the combined use with the modified polyolefin resin is indispensable in this technique. In addition, there are such problems that it is difficult to achieve compatibility and that interfacial peeling is likely to occur since the amount added to the polyamide resin is large. Furthermore, there is room for improvement in that compatibility is poor, interfacial peeling is likely to occur, and molding is difficult since a fluorine-based or silicone-based lubricant is blended.

Furthermore, as a method for improving the antifouling property of leather, a method of coating a resin or the like on the leather surface is known. JP-A 2010-241963 (Patent Document 4) discloses that a resin such as an acrylic resin, an acrylic silica resin, and an acrylic polysiloxane resin is blended with a silicone-based tactile agent and applied to natural leather. In addition, Japanese Patent Publication No. 2008-308785 (Patent Document 5) discloses that a silicone resin film is formed on the surface of synthetic leather made of an urethane resin. However, the problems are that the refractive index of the silicone resin is low, and the refractive index is far away from those of urethane resin and vinyl chloride resin, so that the film becomes turbid and whitened. The present inventor has also studied the silicone acrylic graft copolymer resin emulsion in the invention described in JP-A 2016-138242 (Patent Document 6) and discloses that the problem of whitening does not occur. However, recently, artificial leather itself has been made lighter (thinner film), and the thickness of the coating agent has been increased to maintain strength, and the amount of silicone has been increased to improve abrasion resistance. At that time, there is a problem that the appearance is whitened.

JP-A 2003-082227 (Patent Document 7) and JP-A 2004-107526 (Patent Document 8) disclose polyamide compositions containing a silicone resin. In addition, JP-A 2001-261919 (Patent Document 9) discloses that a slidability modifier in which a silicone-based oil or an olefin-based oil is mixed with a composite rubber-based graft copolymer in which at least one vinyl polymer is graft-polymerized to a composite rubber composed of an organopolysiloxane rubber component and a polyalkyl (meth)acrylate component is blended to in a thermoplastic resin or a thermoplastic elastomer. However, this technique has room for improvement in that compatibility is poor, interfacial peeling is likely to occur, and molding is difficult since silicone-based oil or olefin-based oil is blended.

In addition, JP-A 2015-224252 (Patent Document 10) proposes a technique aimed at reducing friction coefficient and improving abrasion resistance by mixing silicone oil with a silicone acrylic graft copolymer. However, in this technology, the silicone oil added to the silicone acrylic graft copolymer has a composition of only dimethylsiloxane and is difficult to mix with the resin. As a result, a lot of bleed occurs on the surface, but rather a tackiness appears, and the reduction of the friction coefficient and the improvement of the abrasion resistance cannot be sufficiently achieved. Thus, when the above additive components are kneaded into various resins, the transparency of the resin molded product is greatly hindered.

CITATION LIST

Patent Document 1: JP-A 2007-138326
Patent Document 2: JP-A 2007-314919
Patent Document 3: JP-A 2002-363403
Patent Document 4: JP-A 2010-241963
Patent Document 5: JP-A 2008-308785
Patent Document 6: JP-A 2016-138242
Patent Document 7: JP-A 2003-082227
Patent Document 8: JP-A 2004-107526
Patent Document 9: JP-A 2001-261919
Patent Document 10: JP-A 2015-224252

SUMMARY OF THE INVENTION

The present invention has been made in view of the above circumstances, and it is therefore an object of the present invention to provide a thermoplastic urethane resin molded product made of a thermoplastic urethane resin composition containing a silicone acrylic graft copolymer resin having abrasion resistance and antifouling property and having a whitening prevention function.

As a result of intensive studies to achieve the above object, the present inventor has particularly found that a resin molded product obtained by blending a thermoplastic urethane resin and a silicone acrylic graft copolymer resin having dimethyldiphenylsiloxane and injection molding or extrusion molding these resin compositions has abrasion resistance and mold releasability, and can maintain transparency well. It has been found out that this resin molded product is a resin molded product consisting of a urethane resin composition that having improved compatibility, reduced interfacial peeling, and tribological properties such as abrasion resistance, compared to when silicone oil is mixed with silicone acrylic graft copolymer resin, and has completed the present invention.

Therefore, the present invention provides the following thermoplastic urethane resin molded product.

1. A resin molded product comprising:
   (I) a thermoplastic urethane resin: 80 to 99.9% by weight; and
   (II) a silicone acrylic graft copolymer resin: 0.1 to 20% by weight, the silicone acrylic graft copolymer resin comprising:
   (A) an organopolysiloxane represented by the following general formula (1):

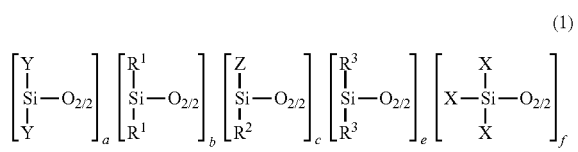

(1)

wherein $R^1$ is a substituted or unsubstituted monovalent hydrocarbon group having 1 to 20 carbon atoms, $R^2$ is an alkenyl group having 2 to 6 carbon atoms or an alkyl group having 1 to 6 carbon atoms in which a part of hydrogen atoms bonded to the carbon atoms is substituted with a mercapto group, vinyl group, acryloxy group or methacryloxy group, independently of each other, $R^3$ is a phenyl group, X is a substituted or unsubstituted monovalent hydrocarbon group having 1 to 20 carbon atoms, alkoxy group having 1 to 20 carbon atoms, or hydroxyl group, independently of each other, Y is a group defined by X or a group represented by $-[O-Si(X)_2]_d-X$, independently of each other, at least two of the groups represented by X and Y are hydroxyl groups, Z is an alkyl group having 1 to 4 carbon atoms, an alkoxy group having 1 to 4 carbon atoms or a hydroxyl group, independently of each other, a is a number of 0 or more, b is a positive number that is 11.0 to 91.5% per total number of a to f, c is a positive number that is 0.0001 to 5% per total number of a to f, e is a number with a ratio of 8.5 to 60.0% with respect to the total number of a to f, f is a positive number of 0 to 24.0%[1] per total number of a to f, and d is a positive number of from 0 to 10; and (B) an acrylic ester unit or a methacrylic ester unit, wherein a weight ratio of these components is (A):(B)=50:50 to 90:10.

2. The resin molded product according to 1 above, wherein the resin molded product is an injection molded product or an extrusion molded product.

3. The resin molded product according to 1 above, wherein an amount (e) of diphenylsiloxane in the organopolysiloxane represented by the general formula (1) is from 8.5 to 60.0% by weight or less.

4. The resin molded product according to 1 above, wherein the organopolysiloxane represented by the general formula (1) has a weight average molecular weight of from 1,000 to 200,000.

5. The resin molded product according to 1 above, wherein the silicone acrylic graft copolymer resin composition as the component (II) is an emulsion graft copolymer comprising,
   (i) 100 parts by weight of the organopolysiloxane represented by the general formula (1),
   (ii) 10 to 100 parts by weight of an acrylic ester monomer or a methacrylic ester monomer, and
   (iii) 0.01 to 20 parts by weight of a functional group-containing monomer copolymerizable therewith, if necessary.

6. The resin molded product according to 1 above, wherein the thermoplastic urethane resin as the component (1) is a polyester-based, polyether-based or polycarbonate-based urethane resin.

7. The resin molded product according to 1 above, wherein the resin molded product with a thickness of 2 mm or the resin molded product with a thickness of 200 μm has a haze value of 85% or less.

Advantageous Effects of the Invention

The resin molded product of the present invention is a molded product having excellent abrasion resistance and antifouling properties, preventing whitening and having a good light transmission function. Furthermore, since the resin molded product of the present invention is obtained by kneading the additive component of the silicone acrylic graft copolymer into an urethane resin, there are great advantages in terms of work and environment in the production thereof.

DESCRIPTION OF THE PREFERRED EMBODIMENT

The present invention is a resin molded product comprising the following components (I) and (II):
(I) thermoplastic urethane resin, and
(II) silicone acrylic graft copolymer resin.

The (I) thermoplastic urethane resin is a reaction product of a polyisocyanate and a polyol, and the polyol includes various water-soluble urethane resins using polyethers-based polyol, polycarbonates-based polyol, polyesters-based polyol and the like as the polyol. In this case, the above (I) thermoplastic urethane resin may have a hardness (Shore A) of at least 80 and preferably not more than 95.

The blending amount of the thermoplastic urethane resin is 80 to 99.9% by weight, preferably 90 to 95% by weight per total amount of the resin composition. If the amount of the thermoplastic urethane resin is less than 80% by weight, the film properties of the resin molded product such as abrasion resistance are extremely deteriorated, and if the amount of the thermoplastic urethane resin exceeds 99.9% by weight, the surface of the resin molded product is not smooth and its tactile sensation is deteriorated.

The above (II) silicone acrylic graft copolymer resin has an organopolysiloxane (A) represented by the following general formula (1) and an acrylic ester unit or a methacrylic ester unit (B). The weight ratio of the components is (A):(B)= from 50:50 to 90:10.

The above (II) silicone acrylic graft copolymer resin is preferably a resin obtained by an emulsion graft polymerization of a mixture of (i) an organopolysiloxane represented by the following general formula (1), (ii) a (meth)acrylic acid ester monomer, and (iii) a functional group-containing monomer copolymerizable therewith.

The above (II) silicone acrylic graft copolymer resin (emulsion) contains from 10 to 100 parts by weight of (ii) component and from 0.01 to 20 parts by weight of (iii) component per 100 parts by weight of (i) component. In particular, the above (ii) component is preferably from 40 to 100 parts by weight, and the above (iii) component is preferably from 0.01 to 5 parts by weight.

Here, the above (i) organopolysiloxane is represented by the following general formula (1):

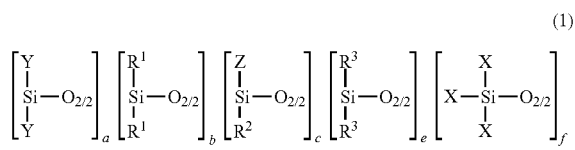

(1)

Here, in the above formula, $R^1$ is a substituted or unsubstituted monovalent hydrocarbon group having 1 to 20 carbon atoms, and a phenyl group is excluded. Illustrative examples of the monovalent hydrocarbon group for $R^1$ include alkyl groups such as a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group and an octadecyl group; cycloalkyl groups such as a cyclopentyl group, a cyclohexyl group and a cycloheptyl group; alkenyl groups such as a vinyl group and an allyl group; aryl groups such as a tolyl group and a naphthyl group; alkenyl aryl groups such as a vinylphenyl group; aralkyl groups such as a benzyl group, a phenylethyl group and a phenylpropyl group; alkenyl aralkyl groups such as a vinylbenzyl group and a vinylphenylpropyl group and the like, and groups in which some or all of the hydrogen atoms of these groups are substituted with halogen atoms such as fluorine, bromine and chlorine; acryloxy groups, methacryloxy groups, carboxyl groups, alkoxy groups, alkenyloxy groups, amino groups, alkyl or alkoxy or (meth)acryloxy-substituted amino groups. $R^1$ is preferably a methyl group.

In the above formula, $R^2$ is an alkyl group having 1 to 6 carbon atoms that is substituted with a mercapto group, an acryloxy group, a methacryloxy group or a vinyl group. Specifically, the substituted alkyl group is preferably a mercaptopropyl group, an acryloxypropyl group, a methacryloxypropyl group, a vinyl group or the like.

In the above formula, $R^3$s are independently phenyl groups, and the weight of diphenylsiloxane of the organopolysiloxane was determined as follows. The organopolysiloxane represented by the above formula (1) was dissolved in hexane in an arbitrary amount, and a calibration curve was prepared from the absorbance at a wavelength of 264.0 nm of a spectrophotometer. The oil from which the water content of the emulsion had been sufficiently removed was dissolved in hexane, and the contained weight of diphenylsiloxane was determined from the concentration and the calibration curve. From the viewpoint of balance between whitening suppression and surface activity imparting, the contained weight of diphenylsiloxane is from 8.5 to 60.0% by weight, preferably from 20 to 55% by weight.

In the above formula, X is the same or different substituted or unsubstituted monovalent hydrocarbon group having 1 to 20 carbon atoms, or an alkoxy group or hydroxyl group having 1 to 20 carbon atoms. Examples of the unsubstituted or substituted monovalent hydrocarbon group having 1 to 20 carbon atoms are the same as those exemplified for $R^1$. Specific examples of the alkoxy group having 1 to 20 carbon atoms include a methoxy group, an ethoxy group, a propoxy group, a butoxy group, a hexyloxy group, a heptyloxy group, an octyloxy group, a decyloxy group, a tetradecyloxy group and the like. X is preferably a hydroxyl group, a methyl group, a butyl group, or a phenyl group.

In the above formula, Y is the same or different group represented by X or —[O—Si(X)$_2$]$_d$—X. (In this formula, "d" is a positive number of from 0 to 10, preferably of from 0 to 5.)

In the above formula, Z is an alkyl group having 1 to 4 carbon atoms, an alkoxy group or a hydroxyl group having 1 to 4 carbon atoms, preferably a hydroxyl group or a methyl group.

In the above formula, "a" is a number of 0 or more, "b" is a positive number that is from 11.0 to 91.5% per total number of "a" to "f". And, in the above formula, "c" is from 0.0001 to 5% per total number of "a" to "f", and "e" is a number having the ratio with respect to the total number of "a" to "f" is from 8.5 to 60.0%, preferably from 20 to 55%. In the above formula, "f" is from 0 to 24.0% per total number of "a" to "f", and preferably from 3 to 15%.

The weight average molecular weight of the above (i) organopolysiloxane is not particularly limited so long as the number of siloxane units (number of moles) represented by the above "a" to "f" satisfies the above range. The organopolysiloxane preferably has a weight average molecular weight of from 1,000 to 200,000, more preferably from 1,500 to 150,000, further preferably from 3,000 to 100,000. This weight average molecular weight indicates a value measured by gel permeation chromatography (GPC) using polystyrene as a standard substance.

The above (i) organopolysiloxane is preferably used in the form of an emulsion, and a commercially available product may be used or it may be synthesized. In the case of the synthesis, it can be carried out by a known emulsion polymerization method, for example, a cyclic organosiloxane, an α, ω-dihydroxysiloxane oligomer, an α, ω-dialkoxysiloxane oligomer, an alkoxysilane and the like, which may have a fluorine atom, a (meth)acryloxy group, a carboxyl group, a hydroxyl group and an amino group; a diphenyldialkylsiloxane; and a silane coupling agent represented by the following general formula (2) are emulsified and dispersed in water using an anionic surfactant, and then, a polymerization reaction is carried out if necessary, a catalyst such as an acid is added, and thereby it can be easily synthesized.

$$R^4{}_{(4-g-h)}R^5{}_h Si(OR^6)_g \quad (2)$$

wherein $R^4$ represents a monovalent organic group having a polymerizable double bond, particularly an alkyl group having 1 to 6 carbon atoms substituted with an acryloxy group or a methacryloxy group. $R^5$ represents an alkyl group having 1 to 4 carbon atoms, $R^6$ represents an alkyl group having 1 to 4 carbon atoms, g is an integer of 2 to 3, h is an integer of 0 to 1, and g+h=2 to 3.

As the cyclic organosiloxane, hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethylcyclotetrasiloxane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra [3-(p-vinylphenyl) propyl]tetramethylcyclotetrasiloxane, 1,3,5,7-tetra(N-acryloyl-N-methyl-3-aminopropyl)tetramethylcyclotetrasiloxane, 1,3,5,7-tetra(N,N-bis(lauroyl)-3-aminopropyl)tetramethylcyclotetrasiloxane and the like are exemplified. Preferably, octamethylcyclotetrasiloxane and decamethylcyclopentasiloxane are used.

Examples of the silicone component having a diphenyl component such as the diphenyldialkylsiloxane include KF-50, KF-53, X-21-3265, KF-54, KF-56, HIVAC F-4, and HIVAC F-5 manufactured by Shin-Etsu Chemical Co., Ltd.; SH510, SH550 and SH710 manufactured by Toray Dow Corning; TSF-4300. TSF-437, TSF-431 manufactured by Momentive Performance Materials; and the like.

Illustrative examples of the silane coupling agents include vinylsilanes such as vinyltrimethoxysilane, vinyltriethoxysilane, vinyltripropoxysilane, inyltriisopropoxysilane, vinylmethyldimethoxysilane and vinylmethyldiethoxysilane; acrylic silanes such as γ-(meth)acryloxypropyltrimethoxysilane, γ-(meth)acryloxypropyltriethoxysilane, γ-(meth)acryloxypropyltripropoxysilane, γ-(meth)aciyloxypropyltriisopropoxysilane. γ-(meth)acryloxypropyltributoxysilane, γ-(meth)acryloxypropyhnethyldimethoxysilane, γ-(meth)acryloxypropylmethyldiethoxysilane, γ-(meth)acryloxypropylmethyldipropoxysilane, γ-(meth)acryloxypropylmethyldiisopropoxysilane and γ-(meth)acryloxypropylmethyldibutoxysilane; mercaptosilanes such as γ-mercaptopropyhnethyldimetboxysilane and γ-mercaptopropyltrimethoxysilane; and the like. Alternatively, an oligomer obtained by condensation polymerization of these may be more preferable because the generation of alcohol is suppressed. Here, (meth)acryloxy represents acryloxy or methacryloxy. These silane coupling agents may be used in an amount of preferably from 0.01 to 20 parts by weight, more preferably from 0.01 to 5 parts by weight per 100 parts by weight of the total siloxane.

By copolymerizing the silane coupling agents described above, an organopolysiloxane having a unit of "c" in the following formula can be obtained, and the effect of grafting the organopolysiloxane and (ii) an acrylic acid ester monomer or a methacrylic acid ester monomer, or (iii) a functional group-containing monomer copolymerizable with the above (ii) can be obtained.

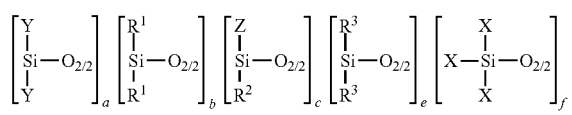

(1)

A known polymerization catalyst may be adopted as the polymerization catalyst used in the above copolymerization. Of these, strong acids are preferable, and hydrochloric acid, sulfuric acid, dodecylbenzenesulfonic acid, citric acid, lactic acid, and ascorbic acid are exemplified. Preferred is dodecylbenzenesulfonic acid having emulsifying ability.

The amount of the acid catalyst used is preferably from 0.01 to 10 parts by weight, more preferably from 0.2 to 2 parts by weight per 100 parts by weight of the total amount of the organopolysiloxane.

As the surfactant for the polymerization, anionic surfactants include sodium lauryl sulfate, sodium laureth sulfate, sodium dialkyl succinate, sodium alkyldiphenyl ether disulfonate, dodecylbenzene sulfonic acid, N-acyl amino acid salts, N-acyl taurine salts, aliphatic soaps, alkyl phosphates, and the like. Among them, those which are easily soluble in water and do not have a polyethylene oxide chain are preferable. Further preferred are N-acyl amino acid salts, N-acyl taurine salts, aliphatic soaps and alkyl phosphates, and particularly preferred are sodium alkyldiphenyl ether disulfonate and sodium lauryl sulfate. The compounding amount of the anionic surfactant is preferably from 0.1 to 20 parts by weight, more preferably from 0.5 to 10 parts by weight per 100 parts by weight of the cyclic organosiloxane.

The polymerization temperature is preferably from 50 to 75° C., and the polymerization time is preferably 10 hours or more, more preferably 15 hours or more. Furthermore, it is particularly preferable to age at 5 to 30° C. for 10 hours or longer after the polymerization.

(ii) Acrylic acid ester or methacrylic acid ester (hereinafter sometimes referred to as (meth)acrylic acid ester) used in the present invention is referred to as an acrylic acid ester monomer or a methacrylic acid ester monomer having no functional group such as hydroxyl group, amide group and carboxyl group. It is preferably an acrylic acid ester or methacrylic acid ester having an alkyl group having 1 to 10 carbon atoms. Furthermore, it is to preferable that a glass transition temperature (hereinafter sometimes referred to as Tg) of a polymer of an acrylic component is 40° C. or higher, more preferably 60° C. or higher. Examples of this monomer include methyl methacrylate, isopropyl methacrylate, ethyl methacrylate, cyclohexyl methacrylate and the like. The upper limit of Tg is preferably 200° C. or lower, more preferably 150° C. or lower. The glass transition temperature as described above can be measured based on JIS K7121.

The functional group-containing monomer (iii) copolymerizable with the component (ii) is a monomer having an unsaturated bond containing a carboxyl group, an amide group, a hydroxyl group, a vinyl group, an allyl group and the like. Specifically, it includes methacrylic acid, acrylic acid, acrylic amide, allyl methacrylate, vinyl methacrylate, 2-hydroxyethyl methacrylate, 2-hydroxypropyl methacrylate. By copolymerizing the above monomer, the compatibility of the resin composition can be improved.

The (II) silicone acrylic graft copolymer resin used in the present invention may be obtained by an emulsion graft polymerizing (i) organopolysiloxane obtained as described above with a mixture of (ii) (meth)acrylic acid ester monomer and (iii) a functional group-containing monomer copolymerizable therewith.

When the graft polymerization is performed, the weight ratio of the organopolysiloxane of the above formula (1) to the (meth)acrylic acid ester monomer (the weight ratio of the organopolysiloxane of formula (1) to the (meth)acryl unit) is from 50:50 to 90:10, preferably from 50:50 to 80:20. If the weight ratio of the organopolysiloxane component is less than 50, there is a problem that slipperiness does not occur when blended with a thermoplastic urethane resin. On the other hand, if the weight ratio of the organopolysiloxane component is more than 90, the compatibility of the resin composition is deteriorated, so that the transparency is lowered and in some cases, delamination occurs.

Examples of the radical initiator used here include persulfates such as potassium persulfate and ammonium persulfate; aqueous hydrogen persulfate; t-butyl hydroperoxide; and hydrogen peroxide. If necessary, a redox system concurrently using a reducing agent such as acidic sodium sulfite, Rongalite, L-ascorbic acid, tartaric acid, saccharides and amines can also be used.

Although it can be sufficiently graft-polymerized with the surfactant already contained in the organopolysiloxane emulsion, an anionic surfactant may be added for the purpose of improving stability. The illustrative examples of the anionic surfactant include sodium lauryl sulfate, sodium laureth sulfate, N-acylamino acid salts, N-acyl taurine salts, aliphatic soaps, alkyl phosphates and the like. Also, a nonionic emulsifier such as polyoxyethylene lauryl ether and polyoxyethylene tridecyl ether may be added.

The graft polymerization temperature of the components (ii) and (iii) per component (i) is preferably from 25 to 55° C., more preferably from 25 to 40° C. The polymerization time is preferably from 2 to 8 hours, more preferably from 3 to 6 hours.

Furthermore, a chain transfer agent may be added in order to adjust the molecular weight and the graft ratio of the graft polymer.

The silicone acrylic graft copolymer resin (II) obtained in this way is a polymer in which monomers of the components (ii) and (iii) are randomly grafted in the form of an emulsion with respect to (i) organopolysiloxane as a base.

The average particle size of the emulsion of the silicone acrylic graft copolymer resin (II) is preferably from 0.1 μm (100 nm) to 1.0 μm (1000 nm). More preferably, it is from 0.1 μm to 0.5 μm. It is noted that the average particle size of the emulsion of the silicone acrylic graft copolymer resin (II) may be measured by a laser diffraction/scattering particle size distribution measuring apparatus.

The blending amount of the silicone acrylic graft copolymer resin (II) in the resin composition is from 0.1 to 20% by weight, preferably from 0.5 to 10% by weight. If the amount of the silicone acrylic graft copolymer resin (II) is less than 0.1% by weight, no improvement is observed in the mold releasability. If it exceeds 20% by weight, it is whitened and slipperiness is reduced.

The obtained emulsion of the silicone acrylic graft copolymer resin (1) may be pulverized by drying after salting out, spray drying and the like.

After the obtained powder is kneaded with thermoplastic urethane resin in dry blend (for example, with a roll, kneader, Banbury mixer, plast mill, extruder, etc.), it is extrusion or injection molded to form a desired shape. It is noted that the thermoplastic urethane resin may be processed in advance into a pellet or powder state. The molding temperature may be a temperature equal to or higher than the temperature at which the resin mixture melts. It is preferable that the molding be performed at a set temperature of from 180 to 250° C. For example, the pellets are obtained from a strand die using a twin screw extruder of Labo Plast Mill (manufactured by Toyo Seiki Seisakusho). Using the pellets, an injection molded piece of 3 cm×3 cm 2 mm is molded by a small injection molding machine (manufactured by Nissei Plastic Industry Co., Ltd.) of 80 tf at a temperature of from 180 to 250° C. Similarly, a film of about 200 μm is molded from a T die using the twin screw extruder of Labo Plast Mill. At this time, the resin molded product is required to have transparency, but both the haze value of the resin molded product having a thickness of 2 mm and the haze value of the resin molded product having a thickness of 200 μm are preferably 85% or less. If it exceeds 85%, the transparency with the eyes is not felt at all, and there may be a problem that the color/pattern of the substrate cannot be seen at all. It is noted that the thickness of the molded product be adjusted as appropriate, and for example, it can be molded into various thicknesses within a range of from 10 μm to 10 mm.

Furthermore, an antioxidant, a colorant, an ultraviolet absorber, a light stabilizer, an antistatic agent, a plasticizer, a flame retardant, other resins and the like may be added to the resin molded product of the present invention, as long as the performance is not affected.

The resin molded product of the present invention is not particularly limited in use, but the urethane resin molded products become a material for stationery, toys, home appliances, car seats, furniture, clothing, shoes, bags, sanitary products, outdoor tents, etc.

EXAMPLES

Hereinafter, although Examples and Comparative Examples are shown and the present invention is described specifically, the present invention is not limited to the following Examples. Note that a part and % show a weight part and weight % in the following Examples, respectively.

Production Examples and Comparative Production Examples of Silicone Acrylic Graft Copolymer Resin Production Example 1

A solution of 600 g of diphenyldimethylsiloxane ("KF-54" manufactured by Shin-Etsu Chemical Co., Ltd.), 9.6 g of γ-methacryloxypropylmethyldiethoxysilane ("KBM-502" manufactured by Shin-Etsu Chemical Co., Ltd.) and 24 g of 50% sodium alkyldiphenyl ether disulfonate (Perex SS-L, manufactured by Kao Corporation) dissolved in 45 g of pure water and a solution of 6 g of dodecylbenzenesulfonic acid dissolved in 54 g of pure water were charged into a 2 L polyethylene beaker and uniformly emulsified with a homomixer. After that, 490 g of water was gradually added for dilution, and the mixture was passed twice through a high-pressure homogenizer at a pressure of 300 kgf/cm$^2$ to obtain a uniform white emulsion. This emulsion was transferred to a 2 L glass flask equipped with a stirrer, thermometer and reflux condenser, and polymerized at 55° C. for 10 to 20 hours. After that, it was aged at 10° C. for 10 to 20 hours and then the pH was neutralized near neutral with 12 g of 10% sodium carbonate aqueous solution. This emulsion has 51.2% of a non-volatile content (solid content) after dried at 105° C. for 3 hours, and the organopolysiloxane in the emulsion is a non-flowable soft gel. When the amount of diphenylsiloxane was measured, it was 54.1%. The weight average molecular weight (Mw) is shown in Table 1. Here, acrylic graft copolymerization to silicone resin component (organopolysiloxane component) was performed to obtain a silicone acrylic graft copolymer resin emulsion having a nonvolatile content of 44.8% by carrying out a redox reaction with a peroxide and a reducing agent at 30° C., while adding 261 g of methyl methacrylate (MMA) and 9 g of butyl acrylate (BA) dropwise over 3 to 5 hours. This was spray-dried (inlet temperature 150° C.) to volatilize the volatile matter to 1.0% and a resin powder could be obtained.

Production Example 2

A solution of 600 g of diphenyldimethylsiloxane ("KF-54" manufactured by Shin-Etsu Chemical Co., Ltd.), 0.6 g of γ-methacryloxypropylmethyldiethoxysilane ("KBM-502" manufactured by Shin-Etsu Chemical Co., Ltd.) and 24 g of 50% sodium alkyldiphenyl ether disulfonate (Perex SS-L, manufactured by Kao Corporation) dissolved in 45 g of pure water and a solution of 6 g of dodecylbenzenesulfonic acid dissolved in 54 g of pure water were charged into a 2 L polyethylene beaker and uniformly emulsified with a homomixer. After that, 490 g of water was gradually added for dilution, and the mixture was passed twice through a high-pressure homogenizer at a pressure of 300 kgf/cm$^2$ to obtain a uniform white emulsion. This emulsion was transferred to a 2 L glass flask equipped with a stirrer, thermometer and reflux condenser, and polymerized at 55° C. for 10 to 20 hours. After that, it was aged at 10° C. for 10 to 20 hours and then the pH was neutralized to near neutral with 12 g of 10% sodium carbonate aqueous solution. This emulsion has a non-volatile content (solid content) of 51.5% after dried at 105° C. for 3 hours, and the organopolysiloxane in the emulsion is a non-flowable soft gel. When the amount of diphenylsiloxane was measured, it was 54.8%. Here, acrylic graft copolymerization to silicone resin component was performed to obtain a silicone acrylic graft copolymer resin emulsion having a nonvolatile content of 45.2% by carrying out a redox reaction with a peroxide and a reducing agent at 30° C., while adding 261 g of methyl methacrylate (MMA) and 9 g of butyl acrylate (BA) dropwise over 3 to 5 hours. This was spray-dried to volatilize the volatile matter to 1.0% and a resin powder could be obtained.

Production Example 3

A solution of 300 g of octamethylcyclotetrasiloxane (D4), 300 g of diphenyldimethylsiloxane ("KF-54" manufactured by Shin-Etsu Chemical Co., Ltd.), 0.6 g of γ-methacryloxypropylmethyldiethoxysilane ("KBM-502" manufactured by Shin-Etsu Chemical Co., Ltd.) and 24 g of 50% sodium alkyldiphenyl ether disulfonate (Perex SS-L, manufactured by Kao Corporation) dissolved in 100 g of pure water and a solution of 6 g of dodecylbenzenesulfonic acid dissolved in 54 g of pure water were charged into a 2 L polyethylene beaker and uniformly emulsified with a homomixer. After that, 400 g of water was gradually added for dilution, and the mixture was passed twice through a high-pressure homogenizer at a pressure of 300 kgf/cm$^2$ to obtain a uniform white emulsion. This emulsion was transferred to a 2 L glass flask equipped with a stirrer, thermometer and reflux condenser, and polymerized at 55° C. for 10 to 20 hours. After that, it was aged at 10° C. for 10 to 20 hours and then the pH was neutralized near neutral with 12 g of 10% sodium carbonate aqueous solution. This emulsion has a non-volatile content (solid content) of 47.5% after dried at 105° C. for 3 hours, and the organopolysiloxane in the emulsion is a non-flowable soft gel. When the amount of diphenylsiloxane was measured, it was 28.0%. Here, acrylic graft copolymerization to silicone resin component was performed to obtain a silicone acrylic graft copolymer resin emulsion having a nonvolatile content of 44.6% by carrying out a redox reaction with a peroxide and a reducing agent at 30° C., while adding 250 g of methyl methacrylate (MMA) dropwise over 3 to 5 hours. This was spray-dried to volatilize the volatile matter to 0.9% and a resin powder could be obtained.

Production Example 4

A solution of 600 g of diphenyldimethylsiloxane ("KF-54" manufactured by Shin-Etsu Chemical Co., Ltd.), 9.6 g of γ-methacryloxypropylmethyldiethoxysilane ("KBM-502" manufactured by Shin-Etsu Chemical Co., Ltd.) and 48 g of 50% sodium alkyldiphenyl ether disulfonate (Perex SS-L, manufactured by Kao Corporation) dissolved in 45 g of pure water and a solution of 6 g of dodecylbenzenesulfonic acid dissolved in 54 g of pure water were charged into a 2 L polyethylene beaker and uniformly emulsified with a homomixer. After that, 400 g of water was gradually added for dilution, and the mixture was passed twice through a high-pressure homogenizer at a pressure of 300 kgf/cm$^2$. Furthermore, 100 MPa×2 passes were carried out using a starburst to obtain a uniform white emulsion. This emulsion was transferred to a 2 L glass flask equipped with a stirrer, thermometer and reflux condenser, and polymerized at 55° C. for 10 to 20 hours. After that, it was aged at 10° C. for 10 to 20 hours and then the pH was neutralized near neutral with 12 g of 10% sodium carbonate aqueous solution. This emulsion has a non-volatile content (solid content) of 51.5% after dried at 105° C. for 3 hours, and the organopolysiloxane in the emulsion is a non-flowable soft gel. When the amount of diphenylsiloxane was measured, it was 54.1%. Here, acrylic graft copolymerization to silicone resin component was performed to obtain a silicone acrylic graft copolymer resin emulsion having a nonvolatile content of 45.0% by carrying out a redox reaction with a peroxide and a reducing agent at 30° C., while adding 270 g of methyl methacrylate (MMA) dropwise over 3 to 5 hours. This was spray-dried to volatilize the volatile matter to 1.1%, and a resin powder could be obtained.

Production Example 5

A solution of 360 g of octamethylcyclotetrasiloxane, 240 g of diphenyldimethylsiloxane ("KF-54" manufactured by Shin-Etsu Chemical Co., Ltd.), 0.6 g of γ-methacryloxypropylmethyldiethoxysilane ("KBM-502" manufactured by Shin-Etsu Chemical Co., Ltd.) and 24 g of 50% sodium alkyldiphenyl ether disulfonate (Perex SS-L, manufactured by Kao Corporation) dissolved in 45 g of pure water and a solution of 6 g of dodecylbenzenesulfonic acid dissolved in 54 g of pure water were charged into a 2 L polyethylene beaker and uniformly emulsified with a homomixer. After that, 400 g of water was gradually added for dilution, and the mixture was passed twice through a high-pressure homogenizer at a pressure of 300 kgf/cm$^2$ to obtain a uniform white emulsion. This emulsion was transferred to a 2 L glass flask equipped with a stirrer, thermometer and reflux condenser, and polymerized at 55° C. for 10 to 20 hours. After that, it was aged at 10° C. for 10 to 20 hours and then the pH was neutralized near neutral with 12 g of 10% sodium carbonate aqueous solution. This emulsion has a non-volatile content (solid content) of 46.2% after dried at 105° C. for 3 hours, and the organopolysiloxane in the emulsion is a non-flowable soft gel. When the amount of diphenylsiloxane was measured, it was 54.1%. Here, acrylic graft copolymerization to silicone resin component was performed to obtain a silicone acrylic graft copolymer resin emulsion having a nonvolatile content of 45.1% by carrying out a redox reaction with a peroxide and a reducing agent at 30° C., while adding 157 g of methyl methacrylate (MMA) dropwise over 3 to 5 hours. This was spray-dried to volatilize the volatile matter to 1.0% and a resin powder could be obtained.

Comparative Production Example 1

A solution of 600 g of octamethylcyclotetrasiloxane, 0.6 g of γ-methacryloxypropylmethyldiethoxysilane ("KBM-502" manufactured by Shin-Etsu Chemical Co., Ltd.) and 6 g of sodium lauryl sulfate dissolved in 54 g of pure water and a solution of 6 g of dodecylbenzenesulfonic acid dissolved in 54 g of pure water were charged into a 2 L polyethylene beaker and uniformly emulsified with a homomixer. After that, 470 g of water was gradually added for dilution, and the mixture was passed twice through a high-pressure homogenizer at a pressure of 300 kgf/cm² to obtain a uniform white emulsion. This emulsion was transferred to a 2 L glass flask equipped with a stirrer, thermometer and reflux condenser, and polymerized at 55° C. for 24 hours. After that, it was aged at 0° C. for 24 hours and then it was neutralized near neutral with 12 g of 10% sodium carbonate aqueous solution. Here, acrylic graft copolymerization to silicone resin component was performed to obtain a silicone acrylic graft copolymer resin emulsion having a nonvolatile content of 44.8% by carrying out a redox reaction with a peroxide and a reducing agent at 30° C., while adding 232 g of methyl methacrylate (MMA) dropwise over 3 to 5 hours. This was spray-dried to volatilize the volatile matter to 1.2% and a resin powder could be obtained.

Comparative Production Example 2

A solution of 600 g of diphenyldimethylsiloxane ("KF-54" manufactured by Shin-Etsu Chemical Co., Ltd.), 0.6 g of γ-methacryloxypropylmethyldiethoxysilane ("KBM-502" manufactured by Shin-Etsu Chemical Co., Ltd.) and 24 g of 50% sodium alkyldiphenyl ether disulfonate (Perex SS-L, manufactured by Kao Corporation) dissolved in 45 g of pure water and a solution of 5 g of dodecylbenzenesulfonic acid dissolved in 45 g of pure water were charged into a 2 L polyethylene beaker and uniformly emulsified with a homomixer. After that, 490 g of water was gradually added for dilution, and the mixture was passed twice through a high-pressure homogenizer at a pressure of 300 kgf/cm² to obtain a uniform white emulsion. This emulsion was transferred to a 2 L glass flask equipped with a stirrer, thermometer and reflux condenser, and polymerized at 55° C. for 24 hours. After that, it was aged at 0° C. for 24 hours and then it was neutralized near neutral with 12 g of 100 sodium carbonate aqueous solution. The organopolysiloxane in the emulsion is a non-flowable soft gel. When the amount of diphenylsiloxane was measured, it was 54.1%. Here, acrylic graft copolymerization to silicone resin component was performed to obtain a silicone acrylic graft copolymer resin emulsion having a nonvolatile content of 44.8% by carrying out a redox reaction with a peroxide and a reducing agent at 30° C., while adding 944 g of MMA dropwise over 3 to 5 hours. This was spray-dried to volatilize the volatile matter to 1.1%, and a resin powder could be obtained.

Comparative Production Example 3

A solution of 550 g of octamethylcyclotetrasiloxane, 50 g of diphenyldimethylsiloxane ("KF-54" manufactured by Shin-Etsu Chemical Co., Ltd.), 0.6 g of γ-methacryloxypropylmethyldiethoxysilane ("KBM-502" manufactured by Shin-Etsu Chemical Co., Ltd.) and 24 g of 50% sodium alkyldiphenyl ether disulfonate (Perex SS-L, manufactured by Kao Corporation) dissolved in 45 g of pure water and a solution of 6 g of dodecylbenzenesulfonic acid dissolved in 54 g of pure water were charged into a 2 L polyethylene beaker and uniformly emulsified with a homomixer. After that, 490 g of water was gradually added for dilution, and the mixture was passed twice through a high-pressure homogenizer at a pressure of 300 kgf/cm² to obtain a uniform white emulsion. This emulsion was transferred to a 2 L glass flask equipped with a stirrer, thermometer and reflux condenser, and polymerized at 55° C. for 10 to 20 hours. After that, it was aged at 10° C. for 10 to 20 hours and then the pH was neutralized near neutral with 12 g of 10% sodium carbonate aqueous solution. This emulsion has 45.2% of a non-volatile content (solid content) after dried at 105° C. for 3 hours, and the organopolysiloxane in the emulsion is a non-flowable soft gel. When the amount of diphenylsiloxane was measured, it was 7.3%. Here, acrylic graft copolymerization to silicone resin component was performed to obtain a silicone acrylic graft copolymer resin emulsion having a nonvolatile content of 45.1% by carrying out a redox reaction with a peroxide and a reducing agent at 30° C., while adding 232 g of methyl methacylate (MMA) dropwise over 3 to 5 hours. This was spray-dried to volatilize the volatile matter to 0.9% and a resin powder could be obtained.

<Measurement Method of Solid Content>

About 1 g of the resin emulsion (sample) of each example was accurately weighed on an aluminum foil pan, placed in a drier kept at about 105° C., heated for 1 hour, then removed from the drier and allowed to cool in a desiccator. The sample was weighed after drying, and the evaporation residue was calculated by the following equation.

$$R = \frac{T-L}{W-L} \times 100$$

R: Evaporation Residue (%)
W: Weight of aluminum foil pan with sample before dried (g)
L: Weight of aluminum foil pan (g)
T: Weight of aluminum foil pan with sample after dried (g)
Aluminum foil pan dimensions: 70φ×12 h (mm)

<Measurement Method of Average Particle Size of Emulsion>

The particle size of the resin emulsion of each example was measured using a laser diffraction/scattering particle size distribution measuring apparatus (LA950V2) manufactured by HORIBA, Ltd.

TABLE 1

| | | Production Example | | | | | Comparative Production Example | | |
|---|---|---|---|---|---|---|---|---|---|
| | | 1 | 2 | 3 | 4 | 5 | 1 | 2 | 3 |
| Manufacturing of organopolysiloxane | | | | | | | | | |
| Componenets of organopolysiloxane (weight %) | a | 0 | 0 | 0 | 0 | 0 | 0.03 | 0 | 0 |
| | b | 36.9 | 37.6 | 66.7 | 36.9 | 36.9 | 99.87 | 36.9 | 91.8 |
| | c | 1.6 | 0.1 | 1.6 | 1.6 | 1.6 | 0.1 | 1.6 | 0.1 |
| | e | 54.1 | 54.8 | 28.0 | 54.1 | 54.1 | 0 | 54.1 | 7.3 |
| | f | 7.4 | 7.5 | 3.7 | 7.4 | 7.4 | 0 | 7.4 | 0.8 |
| | (Total of a to f) | (100) | (100) | (100) | (100) | (100) | (100) | (100) | (100) |

TABLE 1-continued

|  |  | Production Example | | | | | Comparative Production Example | | |
|---|---|---|---|---|---|---|---|---|---|
|  |  | 1 | 2 | 3 | 4 | 5 | 1 | 2 | 3 |
| Compounding amount of source materials (weight part) | D4 | 0 | 0 | 50 | 0 | 0 | 100 | 0 | 90 |
|  | KF-54 | 100 | 100 | 50 | 100 | 100 | 0 | 100 | 10 |
|  | KBM-502 | 1.6 | 0.1 | 1.6 | 1.6 | 1.6 | 0.1 | 1.6 | 0.1 |
|  | Sodium lautyl sulfate | — | — | — | — | — | 1 | — | — |
|  | Perex SS-L (component conversion) | 2 | 2 | 2 | 4 | 2 | — | 2 | 2 |
|  | Dodecylbenzenesulfonic acid | 1 | 1 | 1 | 1 | 1 | 1 | 1 | 1 |
| Physical properties of organopolysiloxane | Average particle size (nm) | 880 | 900 | 300 | 540 | 880 | 200 | 880 | 250 |
|  | Solid content (%) | 51.2 | 51.5 | 47.5 | 51.5 | 46.2 | 44.8 | 44.8 | 45.2 |
|  | pH | 6.9 | 7.2 | 6.8 | 7.0 | 7.1 | 6.9 | 6.7 | 6.6 |
|  | Mw (GPC) | 1,500 | 1,500 | 8,000 | 1,500 | 1,500 | 250,000 | 1,500 | 50,000 |
|  | Manufacturing of silicone acrylic graft copolymer resin emulsion | | | | | | | | |
| Compound (weight part) | Siloxane described above | 70 | 70 | 70 | 70 | 80 | 70 | 40 | 70 |
|  | Methyl methacrylate (MMA) | 29 | 29 | 30 | 30 | 20 | 30 | 60 | 30 |
|  | Butyl acrylate (BA) | 1 | 1 | | | | | | |
| Physical Properties | Average particle size (nm) | 880 | 880 | 300 | 500 | 850 | 240 | 860 | 300 |
|  | Solid content (%) | 44.8 | 45.2 | 44.6 | 45.0 | 45.1 | 44.8 | 44.8 | 45.1 |

Examples 1 to 7, Comparative Examples 1 to 6

A thermoplastic urethane resin (product name "Elastolan ET-597-10" or "Milactolan XN-2000") and the silicone acrylic graft copolymer resin powders of the Production Examples and Comparative Production Examples were blended in the proportions shown in Table 2 in Labo Plast Mill (manufactured by Toyo Seiki Seisakusho) using a strand die, and resin pellets were prepared at a molding temperature of 200° C. Thereafter, the resin pellets were heat-processed with a small injection molding machine (2 cm×2 cm×2 mm mold), and the resin molded products for Examples 1 to 7 and Comparative Examples 1 to 6 were obtained as shown in Table 2 below.

<Haze Value>

As a haze meter, NDH7000 (manufactured by Nippon Denshoku Industries Co., Ltd.) was used, and the haze value of the resin molded product of each example was measured.

<Mold Releasability>

Cooling was performed at a mold temperature of 60° C., and the number of times the molded product was released from the mold only with the protruding pin (ejector pin) during 10 times was expressed in % (for example, when the mold is released with the pin 8 times out of 10 times, "80%" is displayed.) It noted that the protruding pin is built in the mold.

TABLE 2

| Compound (weight part) | | Example | | | | | | | Comparative Example | | | | | |
|---|---|---|---|---|---|---|---|---|---|---|---|---|---|---|
|  |  | 1 | 2 | 3 | 4 | 5 | 6 | 7 | 1 | 2 | 3 | 4 | 5 | 6 |
| Elastolan ET-597-10 | | 99.5 | 95.0 | 99.5 | 99.5 | 99.5 | 99.5 |  | 100 |  | 99.5 | 99.5 | 99.5 | 70 |
| Milactolan MN-2000 | | | | | | | | 99.5 |  | 100 | | | | |
| Production Example | 1 | 0.5 | 5.0 | | | | | 0.5 | | | | | | 30 |
|  | 2 | | | 0.5 | | | | | | | | | | |
|  | 3 | | | | 0.5 | | | | | | | | | |
|  | 4 | | | | | 0.5 | | | | | | | | |
|  | 5 | | | | | | 0.5 | | | | | | | |
| Comparative Production Example | 1 | | | | | | | | | | 0.5 | | | |
|  | 2 | | | | | | | | | | | 0.5 | | |
|  | 3 | | | | | | | | | | | | 0.5 | |
| Haze Value (%) | | 81.8 | 82.8 | 84.0 | 82.6 | 81.4 | 81.3 | 83.5 | 81.2 | 83.6 | 96.3 | 96.2 | 99.6 | 99.8 |
| Mold Releasability (%) | | 100 | 100 | 100 | 100 | 100 | 100 | 100 | 40 | 0 | 100 | 100 | 80 | 60 |

Product name "Elastolan ET-597-10":

Thermoplastic polyurethane (polyester) manufactured by BASF,

Shore A hardness "97"

Product name "Milactolan XN-2000":

Thermoplastic polyurethane (polycarbonate) manufactured by Tosoh,

Shore A hardness "85"

The haze value and mold releasability of the resin molded product obtained in each Example were evaluated as follows.

Examples 8 to 14, Comparative Examples 7 to 12

The resin molded products (films) of Examples 8 to 14 and Comparative Examples 7 to 12 having a thickness of about 200 μm were prepared at a molding temperature of about 200° C. by using a T-die for Labo Plast Mill (manufactured by Toyo Seiki Seisakusho Co., Ltd.) and blending a thermoplastic urethane resin (product name "Elastolan ET-597-10" or "Milactolan XN-2000") and silicone acrylic graft copolymer resin powders of production examples and comparative production examples in the proportions shown in Table 3.

TABLE 3

| Compound (weight part) | Example 8 | 9 | 10 | 11 | 12 | 13 | 14 | Comparative Example 7 | 8 | 9 | 10 | 11 | 12 |
|---|---|---|---|---|---|---|---|---|---|---|---|---|---|
| Elastolan ET-597-10 | 95 | 90 | 95 | 95 | 95 | 95 | | 100 | | 95 | 95 | 95 | 0 |
| Milactolan XN-2000 | | | | | | | 95 | | 100 | | | | |
| Production Example 1 | 5 | 10 | | | | | 5 | | | | | | 30 |
| 2 | | | 5 | | | | | | | | | | |
| 3 | | | | 5 | | | | | | | | | |
| 4 | | | | | 5 | | | | | | | | |
| 5 | | | | | | 5 | | | | | | | |
| Comparative Production Example 1 | | | | | | | | | | 5 | | | |
| 2 | | | | | | | | | | | 5 | | |
| 3 | | | | | | | | | | | | 5 | |
| Haze Value (%) | 81.2 | 83.5 | 80.1 | 84.9 | 61.7 | 69.2 | 81.0 | 0.2 | 2.0 | 99.1 | 94.2 | 95.8 | 99.8 |
| Static Friction Coefficient | 1.65 | 1.52 | 1.55 | 1.45 | 1.60 | 1.70 | 1.95 | 1.92 | 2.52 | 1.16 | 1.62 | 1.20 | 2.20 |
| Dynamic Friction Coefficient | 0.62 | 0.54 | 0.54 | 0.44 | 0.59 | 0.65 | 1.33 | 1.31 | 1.78 | 0.37 | 0.68 | 0.68 | 1.20 |

<Measurement of Haze Value>

As a haze meter, NDH7000 (manufactured by Nippon Denshoku Industries Co., Ltd.) was used, and the haze value of above each example was measured.

<Static/Dynamic Friction Coefficient>

Measurements were made with HEIDON TYPE-R (manufactured by Shinto Kagaku Co., Ltd.), and the friction coefficient was measured from the friction force, the measurement of which is based on the linear sliding type. The friction coefficient was calculated from the friction force when a 200 g metal indenter was brought into contact with the coating film vertically and moved at 3 cm/min.

Japanese Patent Application No. 2019-025022 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A resin molded product comprising:
   (I) a thermoplastic urethane resin: 80 to 99.9% by weight; and
   (II) a silicone acrylic graft copolymer resin: 0.1 to 20% by weight, the silicone acrylic graft copolymer resin comprising:
      (A) an organopolysiloxane represented by the following general formula (1):

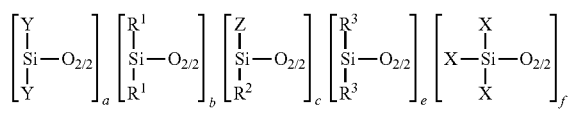

(1)

wherein
R$^1$ is a substituted or unsubstituted monovalent hydrocarbon group having 1 to 20 carbon atoms, R$^2$ is an alkenyl group having 2 to 6 carbon atoms or an alkyl group having 1 to 6 carbon atoms in which a part of hydrogen atoms bonded to the carbon atoms is substituted with a mercapto group, vinyl group, acryloxy group or methacryloxy group, independently of each other, R$^3$ is a phenyl group, X is a substituted or unsubstituted monovalent hydrocarbon group having 1 to 20 carbon atoms, alkoxy group having 1 to 20 carbon atoms, or hydroxyl group, independently of each other, Y is a group defined by X or a group represented by -[O—Si(X)$_2$]d-X, independently of each other, at least two of the groups represented by X and Y are hydroxyl groups, Z is an alkyl group having 1 to 4 carbon atoms, an alkoxy group having 1 to 4 carbon atoms or a hydroxyl group, independently of each other, a is a number of 0 or more, b is a positive number that is 11.0 to 91.5% per total number of a to f, c is a positive number that is 0.0001 to 5% per total number of a to f, e is a number with a ratio of 8.5 to 60.0% with respect to the total number of a to f, f is a positive number of 3 to 15% per total number of a to f, and d is a positive number of from 0 to 10; and
      (B) an acrylic ester unit or a methacrylic ester unit grafted onto the organopolysiloxane, wherein a weight ratio of these components is (A):(B)=50:50 to 90:10, and
   the silicone acrylic graft copolymer resin is an emulsion graft copolymer obtained by an emulsion graft polymerization of a mixture containing:
      (i) the organopolysiloxane represented by the general formula (1),
      (ii) 10 to 100 parts by weight of the acrylic ester monomer or the methacrylic ester monomer per 100 parts by weight of the component (i), and
      optionally, (iii) 0.01 to 20 parts by weight of a functional group-containing monomer per 100 parts by weight of the component (i), the functional group-containing monomer being copolymerizable with the component (ii).

2. The resin molded product according to claim 1, wherein the resin molded product is an injection molded product or an extruded molded product.

3. The resin molded product according to claim 1, wherein an amount (e) of diphenylsiloxane in the organopolysiloxane represented by the general formula (1) is 8.5% by weight or more and 60.0% by weight or less.

4. The resin molded product according to claim 1, wherein the organopolysiloxane represented by the general formula (1) has a weight average molecular weight of 1,000 to 200,000.

5. The resin molded product according to claim 1, wherein the thermoplastic urethane resin as the component (I) is a polyester-based, polyether-based or polycarbonate-based urethane resin.

6. The resin molded product according to claim 1, wherein a haze value of the resin molded product at a thickness of 2 mm and at a thickness of 200 μm is 85% or less.

* * * * *